Figure 1:
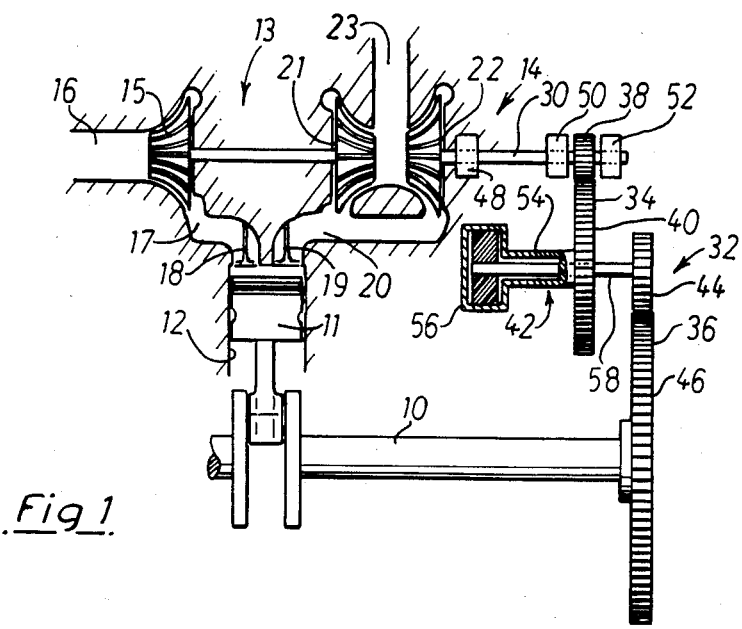

United States Patent [19]

Flaxington et al.

[11] Patent Number: 4,622,818
[45] Date of Patent: Nov. 18, 1986

[54] BEARING SYSTEM FOR A GAS TURBINE

[76] Inventors: David Flaxington, 1 Crabtree Close, Great Bookham, Leatherhead, Surrey, England, KT23 4PQ; James Kay, 1 Netherley Drive, Marsden, West Yorkshire, England, HD7 6HL; Steven M. Miller, 12 Harrington Court, Meltham, Huddersfield, West Yorkshire, England, HD7 3ED

[21] Appl. No.: 725,665

[22] Filed: Apr. 22, 1985

[30] Foreign Application Priority Data

Apr. 24, 1984 [GB] United Kingdom ............... 84 10450

[51] Int. Cl.[4] .................. F02B 37/00; F02G 3/00
[52] U.S. Cl. .................. 60/624; 415/122 R; 417/407
[58] Field of Search ............ 60/624; 415/122 R; 417/407

[56] References Cited

U.S. PATENT DOCUMENTS

| 2,631,901 | 4/1953 | Holben | 308/26 |
| 2,848,866 | 8/1958 | Geislinger | 60/624 |
| 3,056,634 | 10/1962 | Woollenweber, Jr. | 308/78 |
| 3,096,126 | 7/1963 | Woollenweber, Jr. | 308/9 |
| 3,269,317 | 8/1966 | Lattanzio | 415/122 R |
| 3,619,086 | 11/1971 | Johnson | 415/122 R |
| 4,128,283 | 12/1978 | Palmer | 417/407 |

FOREIGN PATENT DOCUMENTS

| 171344 | 5/1952 | Austria | 123/559 |
| 206845 | 2/1924 | United Kingdom . | |
| 556209 | 9/1943 | United Kingdom | 60/624 |
| 1428733 | 3/1976 | United Kingdom . | |

Primary Examiner—Douglas Hart
Attorney, Agent, or Firm—John S. Hale

[57] ABSTRACT

A gas turbine (22) of a compound internal combustion engine is coupled by a double reduction gear (32) to the engine crankshaft. The turbine shaft (30) is journalled by a floating bearing (48) adjacent the turbine wheel (22) and by two bearings (50 and 52) adjacent the gear wheel (38). At least one of the latter bearings (50, 52) is a fixed bearing. The intermediate shaft (42) of the double reduction gear incorporates a flexible coupling (56) which is disposed outside the gearbox (60). The flexible coupling has rubber or the like resilient material (88) between its parts (84, 86).

10 Claims, 3 Drawing Figures

BEARING SYSTEM FOR A GAS TURBINE

DESCRIPTION

The present invention relates to bearing system and more particularly to a gas turbine journalled for rotation at high speed and provided with an output reduction gear.

UK Patent Application No. 2036185A describes a turbo-supercharged compound combustion engine, in which a first turbine, driven by exhaust gases of a reciprocating internal combustion engine, rotates a compressor for the inlet air to the reciprocating engine, and in which a second or power turbine, also driven by exhaust gases of the reciprocating engine, supplies additional power to the engine crankshaft via a reduction gear, usually a two-stage reduction gear. The power turbine wheel is overhung mounted at one end of the shaft and a gear wheel of the reduction gear is attached to the turbine shaft at or adjacent its other end.

It is desirable for the power turbine to be designed to run at extremely high speeds, e.g. 100,000 rpm. or more. At such speeds, out-of-balance forces, particularly of the heavy turbine wheel, become significant and must be withstood. At the same time, the gear wheel must be kept on center so that it remains in its designed meshing relationship with its complementary gear wheel of the step-down gear. Furthermore, shaft vibration at natural frequencies of the shaft must be damped.

According to the present invention, a gas turbine comprises a shaft, a turbine wheel overhung mounted at one end of the shaft, a gear wheel adjacent the other end of the shaft and bearings journalling the shaft, of which one bearing is adjacent to the turbine and of which two further bearings are adjacent the gear wheel and at opposite sides thereof, the bearing adjacent the turbine wheel being a floating bearing and at least one of the bearings adjacent the gear wheel being a fixed bearing.

A floating bearing is one in which a shaft journal is rotatably received in a ring or bush which in turn is rotatably received in a bearing bore. There is thus a lubricating oil film between the journal and the ring and a further lubricating oil film between the ring and the bearing bore. The ring is free to rotate and usually adopts a speed of about one third of the shaft speed. The ring allows the shaft to deflect under the out-of-balance forces and the oil films damp shaft vibrations.

A fixed bearing is a bearing, in the present invention, usually a plain journal bearing, which is designed to hold the shaft at a fixed axis of rotation. The fixed bearing thus keeps the gear wheel rotating about a substantially fixed center to keep it in proper mesh with its complementary gear wheel.

Advantageously, the spacing between the bearings is unequal so that at least one bearing, preferably a fixed bearing is not located at a node of vibration of the shaft.

Preferably, the bearing at the side of the gear wheel facing towards the turbine wheel is a fixed bearing.

In one embodiment, the bearing at the side of the gear wheel facing away from the turbine wheel is also a floating bearing.

In another embodiment, both bearings adjacent the gear wheel are fixed bearings.

Usually, the turbine wheel will be of the inward flow type.

Generally, the reduction gear will be a two-stage reduction gear in which a flexible coupling is incorporated in the intermediate shaft between the output gear wheel of the first stage and the input gear wheel of the second stage for isolating the turbine from rotary oscillations of the crankshaft.

International Patent publication No. WO 80/00169 (UK Patent Application No. 2036486A) describes a compound combustion engine having a two-stage reduction gear between its power turbine and the crankshaft of its reciprocating internal combustion engine. The intermediate shaft is in two parts of which one carries the output gear wheel of the first stage reduction and the other carries the input gear wheel of the second stage reduction. A vibration isolator is arranged between the two parts of the intermediate shaft and thus is located inside the gearbox of the double reduction gear. The vibration isolator is either hydraulic or incorporates a torsion shaft.

According to a feature of the present invention, in a compound combustion engine in which a turbine is coupled to the crankshaft of an internal combustion engine via a double reduction gear, the intermediate shaft of the double reduction gear incorporates a flexible coupling which is situated outside the gearbox of the double reduction gear and which has rubber or the like resilient material between its two parts.

Preferably, the intermediate shaft comprises a hollow spindle journalled in the gearbox and having thereon one gear wheel, preferably the output gear wheel of the first stage reduction, and a quill shaft journalled within the hollow spindle and having at one end thereof another gear wheel, preferably the input gear wheel of the second stage reduction, the other end of the quill shaft being attached to an inner part of the flexible coupling whose outer part is attached to one end of the hollow spindle.

The use of a flexible coupling incorporating rubber or similar material provides for superior isolation of the turbine from crankshaft oscillations and the disposition of the flexible coupling outside the gearbox facilitates cooling of the flexible coupling.

Figure 3:
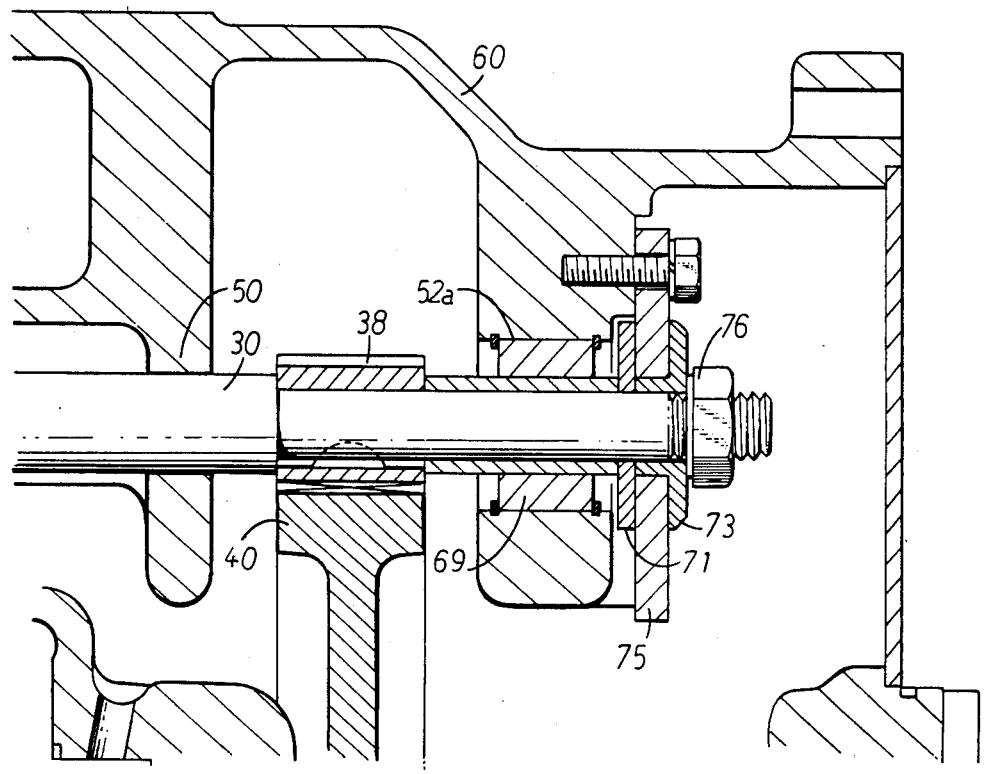
Figure 2:
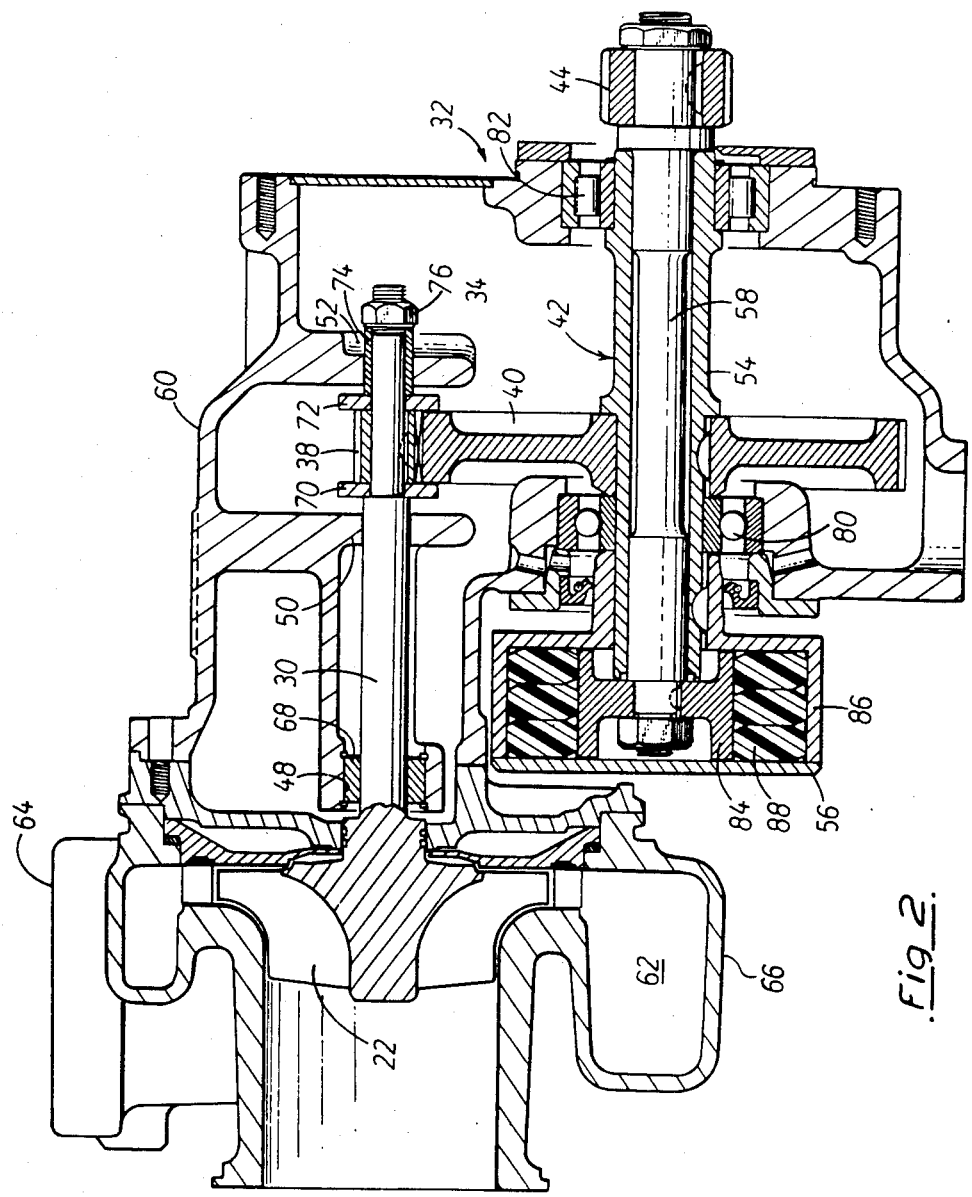

The invention is further described, by way of exmple, with reference to the accompanying drawings in which:

FIG. 1 is a diagrammatic illustration of a turbo supercharged compound combustion engine incorporating a gas turbine in accordance with the present invention, FIG. 2 is a sectional view of the gas turbine and part of its reduction gear and FIG. 3 is a diagrammatic detail sectional view illustrating a modification to the bearing system for the gas turbine.

The compound combustion engine shown in FIG. 1 comprises a reciprocating internal combustion engine, such as a diesel engine, of which the drawing shows only a part of the crankshaft 10 and an associated piston 11 reciprocable in a cylinder 12. The compound combustion engine further comprises a turbo-supercharger 13 and a power turbine 14. The turbo supercharger 13 comprises a radial compressor 15 which inducts air from an inlet 16 and supplies compressed air to an inlet manifold 17 with which the reciprocating engine inlet valves 18 communicate. The inlet manifold 17 is common to all of the cylinders of the reciprocating engine although only one cylinder 12 is shown. The exhaust gases are admitted by exhaust valves 19 to an exhaust manifold 20 which is likewise common to all of the cylinders of the reciprocating engine. Some of the exhaust gas from the manifold 20 flows to a first turbine wheel 21 which drives the compressor 15 and the remainder of the exhaust gases flows to a second turbine wheel 22 of the power turbine 14. The exhaust gases flow from the turbine wheels 21 and 22 to an exhaust pipe 23. The turbine wheels are shown as being of the inward flow type although axial flow turbine wheels may be used if desired. While the two turbines are shown operating in parallel, they may alternatively be in series so that all the exhaust gases flow serially through both turbines.

The power turbine 14 comprises a turbine shaft 30 on one end of which the turbine wheel 22 is overhung mounted. The turbine shaft 30 is coupled by a double reduction gear 32 to the crankshaft 10 of the reciprocating engine in order to transmit further power to the crankshaft. The double reduction gear 32 comprises a first stage 34 and a second stage 36. The input gear wheel 38 of the first stage is mounted on the turbine shaft 30 adjacent its end opposite the turbine wheel 22. The output gear wheel 40 of the first stage 34 is connected by means of an intermediate shaft 42 to the input gear wheel 44 of the second stage 36 whose output gear wheel 46 is on the crankshaft 10. The turbine shaft 30 is journalled in three bearings 48, 50 and 52 to be described below in more detail with reference to FIG. 2. The intermediate shaft 42 comprises a hollow spindle 54 which is connected by means of a flexible coupling 56 to a quill shaft 58, the gear wheel 34 being attached to the hollow spindle 54 and the gear wheel 44 being attached to the quill shaft 58 as also described further below with reference to FIG. 2.

Referring now to FIG. 2, the multi-stage reduction gear 32 incorporates a gearbox 60 in which are journalled the turbine shaft 30 and the intermediate shaft 42. The turbine comprises a volute chamber or scroll 62 which encircles the inward flow turbine wheel 22 and which leads from an inlet 64 to which the exhaust manifold 20 of FIG. 1 is connected. The volute casing 66 is mounted on the gearbox 60.

The bearing 48 which is located adjacent to the turbine wheel 22 is a floating bearing and comprises a freely rotatable ring 68 in which the turbine shaft 30 is journalled and which is itself journalled in the casing 60. Locking rings are provided to prevent axial displacement of the ring 68. A conventional lubricating system (not shown) is provided for maintaining an oil film between the turbine shaft 30 and the ring 68 and a further oil film between the ring 68 and the gearbox housing 60. The ring 68, being free to rotate, is driven from the turbine shaft 30 by the inner oil film and its rotation is resisted by the outer oil film so that the ring 68 adopts a speed of rotation substantially slower than the speed of rotation of the shaft 30, usually about one third of such shaft speed. The floating bearing 48 is chosen to be capable of accommodating deflections of the turbine shaft 30 due to the out-of-balance forces arising as a result of the weight of the turbine wheel 22. The two oil films help to damp the natural frequencies of vibration of the turbine shaft 30.

The bearing 50 which is located adjacent the gear wheel 38 and at that side thereof facing towards the turbine wheel 22 is a fixed bearing. It comprises a plain journal bearing lubricated by means of the conventional lubricating system. Likewise the bearing 52 located adjacent the gear wheel 38 and at that side thereof facing away from the turbine wheel 22 is a fixed bearing in the form of a plain journal bearing lubricated by the conventional lubricating system (not shown). The two fixed bearings 50 and 52 hold the axis of the gear wheel 38 at a substantially fixed position at all times. The bearings 50 and 52 may be designed to restrain the axis of the gear wheel 38 to within two micrometres movement around the steady state eccentric point determined by the usual bearing tchnology. This fixing of the rotary axis of the gear wheel 38 of the reduction gear first stage 34 ensures that the input gear wheel 38 remains at all times in proper mesh with the output gear wheel 40 of the first stage 34.

The pressure drop across the turbine wheel 22 exerts a leftward thrust on the turbine shaft 30. The gear wheels 38 and 40 are helical gears which exert a rightward thrust on the turbine shaft 30 but the rightward and leftward thrusts, while opposing one another, do not normally balance one another. The turbine shaft 30 is therefore provided with a thrust bearing arrangement. In FIG. 2 the thrust bearing arrangement comprises thrust washers 70 and 72 which are clamped against the opposite faces of the input gear wheel 38 by means of a bush 74 and a nut 76. The outer surface of the bush 74 provides the journal of the fixed bearing 52. The thrust washers 70 and 72 are of slightly larger diameter than the gear wheel 38 so that they engage the flanks of the output gear wheel 40. The net axial thrust on the turbine shaft 30 is thereby transferred to the gear wheel 40 and thence to the intermediate shaft 42 which is provided with its own thrust bearing. The inward faces of the thrust washers 70 and 72 are preferably very slightly tapered so that they only actually rub against the axial faces of the teeth themselves of the gear wheel 40. The rubbing velocity is therefore rlatively low so that little friction is generated between the thrust washers 70 and 72 and the gear wheel 40.

The output gear wheel 40 of the first stage 34 is keyed to the hollow spindle 54 which is journalled by means of a ball bearing 80 and a roller bearing 82 in the gearbox 60. The ball bearing 80 acts as a combined radial and thrust bearing and is located adjacent the gear wheel 40. The quill shaft 58 is journalled inside the hollow spindle 54 and carries at one end the input gear wheel 44 of the reduction gear second stage 36 whose output gear wheel 46 is shown in FIG. 1 but is omitted from FIG. 2. As can be seen in FIG. 2, the gear wheel 44 lies outside the gearbox 60.

The other end of the quill shaft 58 is attached to the inner part 84 of the flexible coupling 56. The outer part 86 of the flexible coupling is keyed to the hollow spindle 54. The inner and outer parts 84 and 86 are torsionally interconnected by means of resilient elements 88 made of rubber or similar resilient material. For example rubber blocks can be located between radially outwardly extending fingers on the inner part 84 and radially inwardly extending fingers on the outer part 86. Alternatively or additionally, the rubber or like elements can be bonded to the inner and outer parts. During normal operation the continual flexure of the rubber or like elements 88 develops heat therein and the disposition of the flexible coupling 56 outside the gearbox 60 enables the flexible coupling to be cooled adequately.

FIG. 3 shows two modifications to the embodiment of turbine shown in FIG. 2. Firstly, the bearing 52a at the side of the gear wheel 38 remote from the turbine wheel 22 is a floating bearing incorporating a bearing ring 69 which behaves in the same way as the bearing ring 68 of the floating bearing 48 described with reference to FIG. 2. The fixed bearing 50 at the side of the gear wheel 38 facing the turbine wheel provides sufficient stability for the axis of rotation of the gear wheel 38 to keep the latter in proper mesh with the gear wheel 40.

The second modification shown in FIG. 3 resides in the thrust bearing arrangement. Instead of the thrust washers at opposite sides of the gear wheel 38, thrust washers 71 and 73 are clamped by means of the nut 76 on the end of the turbine shaft 30 and cooperate with opposite faces of a thrust plate 75 which is secured to the gear box 60.

An advantage of the bearing arrangments of the turbines shown in FIGS. 2 and 3 is that the turbines can be rotated at extremely high speeds, that is to say speeds in excess of 100,000 rpm., e.g. 105,000 rpm. or even 110,000 rpm. The double reduction gear is capable of stepping down this very high speed of the designed maximum speed of rotation of the crankshaft of the reciprocating engine.

The thrust bearing arrangements shown in FIGS. 2 and 3 are able to support the varying thrust loads generated by the helical gears of the reduction gear first stage and due to the variable pressure drop across the turbine wheel. The bearing arrangement enables the gas turbine to perform at as low a loss as possible, thereby maximizing mechanical efficiency.

The use of a plain bearing or plain bearings as the fixed bearings avoids assembly difficulties. The second floating bearing 52a of the embodiment of FIG. 3 shares half of the gear load with the fixed bearing 50 but by virtue of its double lubricating oil fill and excellent damping properties, it helps to destroy a dangerous half speed whirl which would might otherwise develop at a maximum design speeds of 105,000 rpm. The plain bearing 50 and the bearing 52 or 52a are located as close as possible to the gear wheel 38 in order to keep the axis of rotation of the gear wheel located as accurately as possible.

The bearings 50 and 52 or 50 and 52a are located closer together than the bearings 48 and 50. Because of this unequal spacing, the first mode of shaft vibration is well damped, since the bearing locations do not coincide with the nodes of the vibration. The first mode vibration is generally a problem on a two bearing turbo charger where the bearing locations do coincide with the nodes.

We claim:

1. A gas turbine comprising a shaft, a turbine wheel overhung mounted at one end of the shaft, a gear wheel adjacent the other end of the shaft and bearings journalling the shaft, said bearings consisting of one bearing adjacent said turbine and two further bearings adjacent said gear wheel and at opposite sides thereof, said bearing adjacent the turbine wheel comprising a floating bearing and at least one of said further bearings adjacent the gear wheel comprising a fixed bearing.

2. A gas turbine according to claim 1, in which said bearings are spaced apart such that the spacing between the bearings is unequal.

3. A gas turbine according to claim 1, in which the bearing at the side of the gear wheel facing towards the turbine wheel comprises a fixed bearing.

4. A gas turbine according to claim 3, in which the bearing at the side of the gear wheel facing away from the turbine wheel comprises a floating bearing.

5. A gas turbine according to claim 1 or 2, in which both of said further bearings adjacent the gear wheel comprise fixed bearings.

6. A gas turbine according to claim 1, in which the turbine wheel, comprises an inward flow type turbine wheel.

7. A gas turbine according to claim 1, comprising a two-stage reduction gear having an intermediate shaft between an output gear wheel of the first stage and an input gear wheel of the second stage and further comprises a flexible coupling incorporated in said intermediate shaft for isolating the turbine from rotary oscillations of a crankshaft.

8. A gas turbine according to claim 7, in which said reduction gear has a gearbox and in which said flexible coupling is situated outside said gearbox and comprised two coupling parts and resilient material between said coupling parts, said resilient material comprising rubber or rubber-like material.

9. In a compound combustion engine in which a turbine is coupled to a crankshaft of an internal combustion engine via a double reduction gear having a gearbox and an intermediate shaft, the improvement comprising a flexible coupling on said intermediate shaft which is situated outside said gearbox of the double reduction gear and which has two parts and resilient material between said parts, said resilient material comprising rubber or rubber like material.

10. A compound combustion engine according to claim 9, in which said intermediate shaft comprises a hollow spindle journalled in the gearbox and having thereon one gear wheel, preferably the output gear wheel of the first stage reduction, and a quill shaft journalled with said hollow spindle and having at one end thereof another gear wheel, preferably the input gear wheel of the second stage reduction, the other end of the quill shaft being attached to an inner one of said parts of the flexible coupling whose other part is attached to one end of the hollow spindle.

* * * * *